US008653409B1

(12) United States Patent
Sodhi

(10) Patent No.: US 8,653,409 B1
(45) Date of Patent: Feb. 18, 2014

(54) SELECTIVE SURFACE SMOOTHING USING LASERS

(75) Inventor: Manbir Sodhi, Kingston, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 2045 days.

(21) Appl. No.: 11/165,460

(22) Filed: Jun. 23, 2005

Related U.S. Application Data

(60) Provisional application No. 60/582,270, filed on Jun. 23, 2004.

(51) Int. Cl.
*B23K 26/00* (2006.01)
*G06F 19/00* (2011.01)

(52) U.S. Cl.
CPC ............ *B23K 26/0081* (2013.01); *G06F 19/00* (2013.01)
USPC ................. 219/121.66; 219/121.61; 700/118; 700/166

(58) Field of Classification Search
USPC ............. 219/121.65, 121.66, 121.68, 121.69, 219/121.61, 121.62; 700/166, 118, 119, 700/120
See application file for complete search history.

(56) References Cited

U.S. PATENT DOCUMENTS

| | | | | |
|---|---|---|---|---|
| 3,549,733 A | * | 12/1970 | Caddell | 219/121.69 |
| 4,555,610 A | * | 11/1985 | Polad et al. | 219/121.68 |
| 4,945,207 A | * | 7/1990 | Arai | 219/121.84 |
| 4,986,664 A | | 1/1991 | Lovoi | |
| 5,118,917 A | | 6/1992 | Van Krieken et al. | |
| 5,986,252 A | * | 11/1999 | Kawamura | 250/205 |
| 6,023,040 A | | 2/2000 | Zahavi et al. | |
| 6,200,908 B1 | | 3/2001 | Vandamme et al. | |
| 2001/0032832 A1 | * | 10/2001 | Chamberlain et al. | 219/121.83 |
| 2002/0046994 A1 | * | 4/2002 | Miesak | 219/121.69 |
| 2002/0188369 A1 | * | 12/2002 | Guertin et al. | 700/119 |
| 2003/0074096 A1 | * | 4/2003 | Das et al. | 700/119 |
| 2004/0133298 A1 | * | 7/2004 | Toyserkani et al. | 700/166 |
| 2006/0081573 A1 | * | 4/2006 | Wissenbach et al. | 219/121.66 |
| 2006/0163222 A1 | * | 7/2006 | Dance et al. | 219/121.69 |
| 2008/0011852 A1 | * | 1/2008 | Gu et al. | 235/454 |

FOREIGN PATENT DOCUMENTS

| | | | |
|---|---|---|---|
| DE | 19732008 A1 | * | 2/1999 |
| JP | 08-206858 A | * | 8/1996 |
| JP | 2000-84689 A | * | 3/2000 |
| JP | 2001-030171 | | 2/2001 |
| JP | 2003-309080 | | 10/2003 |
| WO | WO 03/032129 | | 4/2003 |
| WO | WO-2004-003239 A1 | * | 1/2004 |

OTHER PUBLICATIONS

Machine translation of Japan Patent No. 2000-84,689, Jul. 2010.*

(Continued)

*Primary Examiner* — Geoffrey S Evans
(74) *Attorney, Agent, or Firm* — Gesmer Updegrove LLP

(57) ABSTRACT

A micro melting process to melt surface irregularities or features on a surface of a substrate. The method includes providing a laser and a control mechanism associated with the laser. The control mechanism is used to melt the surface irregularities on the substrate. The control mechanism varies the laser intensity and direction by varying and monitoring the power of the laser. The approach direction of the laser is used to control the manner in which irregularities or surface features are melted, ambient atmospheric conditions, induced motion between the laser and the surface being processed.

14 Claims, 4 Drawing Sheets

(56) References Cited

OTHER PUBLICATIONS

Machine translation of Japan Patent document No. 8-206,858, Nov. 2013.*

Fessler et al., "Functional gradient metallic prototyping through shape deposition manufacturing", Proceedings of Solid Freeform Fabrication Symposium, Aug. 1997, 8 pages.

Geohegan et al., "Pulsed laser deposition of thin superconducting films of Ho1 Ba2 Cu3 O7-x and Yi Ba2 Cu3 O7-x", Journal of Materials Research, vol. 3, No. 6, Nov.-Dec. 1998, pp. 1169-1179.

Mazumder et al., "Direct material deposition: design macro and microstructure", Material Research Innovation, vol. 3, 1999, pp. 118-131.

* cited by examiner

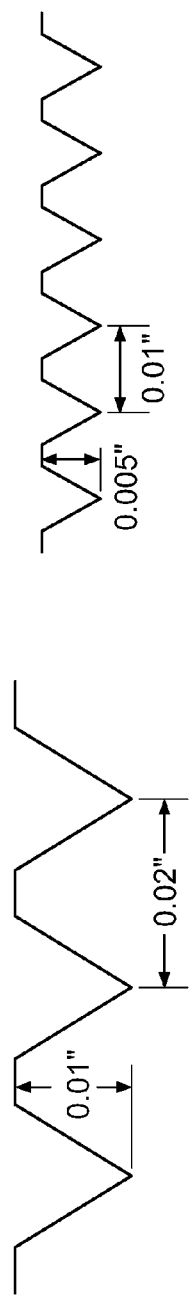
FIG. 3A
FIG. 3B
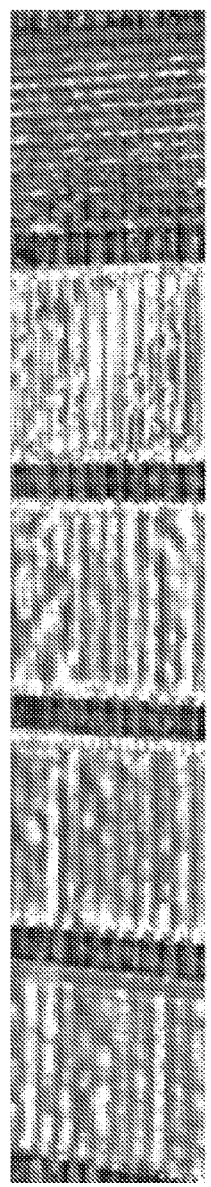
FIG. 4A
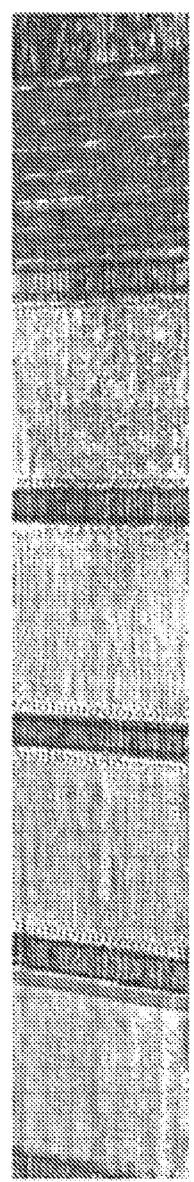
FIG. 4B

SELECTIVE SURFACE SMOOTHING USING LASERS

BACKGROUND OF THE INVENTION

Recent developments in solid free-from fabrication (SFF) techniques have now made it possible to manufacture complex shapes with advanced material systems. It is now feasible to generate parts with specific gradient material and hard metal or ceramic materials. However, much of the attention in SFF has been directed towards attaining volumetric precision. An outstanding issue that must be addressed is that of surface improvement. Currently, SFF techniques generate surfaces with roughness comparable to rough machining operations. With the Laser Engineered Net Shaping (LENS) and the Selective Laser Sintering (SLS) processes, which are among several Rapid Prototyping (RP) methods capable of producing dies and molds, the surface roughness is at the high end of the process scale, i.e. $R_a$ is approximately equal to 25-50 µm (comparable with rough machining and casting). Consequently, post-processing is required to bring the surface quality to specification. The cost of post-processing by finish machining or polishing hard materials (which are typically materials used for tool and die construction) easily exceeds the cost of rough machining. In some cases, the cost of finishing Titanium and hard ceramics can be 60% of the total processing cost. The time and labor involved in finish machining and polishing can also be high compared with the initial machining time, adding to the turnaround delays. Thus, if the potential of SFF technology is to be realized for rapid production of tools and dies and for re-manufacturing valuable components, methods for improving the quality of surfaces produced by these processes must be developed.

The most common use of SFF currently is in the development of prototypes. The potential of these methods in producing tooling is evident, and is a topic of intense research. A variety of SFF technologies have been investigated and developed, including Sterolithography (SLA), Selective laser sintering (SLS), Laser engineered net shaping (LENS), Laminated object manufacturing (LOM) and 3D printing. While these methods have been useful in niche applications, none of these are currently capable of achieving net shapes when the tolerance and surface requirements are stringent. In most cases, while these methods can achieve volume deposition with reasonable precision, the surface finish of parts leaves much to be desired and constrains the direct use of the products so produced. Subsequent processing to improve the surface finish is usually required and this can be as complex and costly as the finish machining of equivalent parts produced by subtractive methods. Further, although these methods have made it possible to design parts with intricate features, these may be difficult to post-process by conventional surface improvement methods such as grinding, lapping, or honing due to constrained tool access. In these cases, it may be useful to use the original CAD files and the same setup as the original fabrication environment to improve the surface quality. In the case of repair and remanufacture of costly components, if the surface roughness specifications can be achieved during the metal deposition operations, expensive and time consuming re-fixturing and finish machining operations can be eliminated, with the savings ultimately passed on to consumers.

Prior art methods of laser smoothing include laser ablation and laser polishing. Laser ablation is a process whereby ultra-short pulsed lasers are focused onto target surfaces, causing impurities or defects to be vaporized or ablated from the work piece. Laser ablation results in negligible heat-affected zones, and hence it has been widely used in thin-film deposition micro-machining and surface cleaning. The main difference between laser ablation and the micro-melting technique proposed here is that the former seeks to vaporize material selectively whereas the latter seeks to re-distribute material selectively. This difference results in substantial implementation differences, the mechanism for controlling the two processes are quire different. In ablation, most of the incident energy is carried away by the ejected material. In micro-melting the energy input has to be precisely directed and controlled so as to guide the material flow from local "hills" to "valleys". In ablation, kerf formation must be minimized. This is clearly not as significant an issue in micro-melting. Ablation seeks to process small material volumes selectively whereas micro-melting also seeks to processes small volumes, but since surface improvement is not usually a local or spot requirement, processing is extensive.

Laser polishing is perhaps most closely related to processes proposed here. Laser polishing and micro-melting both offer similar benefits, i.e. applicability to a wider variety of materials, little to no damage to the base metal and precise control. Several studies on the use and success of laser polishing with different material systems, including glass, polymers, ceramics, diamonds, and metals have been reported in the literature. Laser polishing has found widespread use mostly in the semiconductor industry and the proposal for modeling and investigation the underlying process in the context of general surface improvement is new.

SUMMARY

A process of smoothing rough surfaces by using laser beam to melt the peaks in a selective manner. After a high resolution topographical map of the surface is recorded, a datum is identified. Points above the datum are clustered and areas are identified for selective melting The invention improves surface quality by a combination of planned laser micro-melting/ablation and work piece motion. The micro-melting process considers the following the nature of the irregularities being considered; the material of the substrate; the power of the laser; the approach direction and angle of the laser; and the melting run-off, i.e. the local melting of peaks to flow into the valleys. The information from different substrates is saved in a database(s) and then prior knowledge and computer data can be utilized, along with all of the factors listed above, to control the laser to remove the irregularities in the surface of the substrate.

DESCRIPTION OF THE DRAWINGS

Other objects, features and advantages of the present invention will become more apparent as the description proceeds with reference to the accompanying drawings, wherein:

FIGS. 3a and 3b are groove geometry diagrams for Steel samples S1 and S2;

FIGS. 4a and 4b are scans of Steel samples S1 and S2 after treatment by micro-melting and selective micro-melting, respectively;

DETAILED DESCRIPTION OF THE INVENTION

The invention improves surface quality by a combination of planned laser micro-melting/ablation and work piece motion. The micro-melting process considers the following:
a) the nature of the irregularities being considered;
b) the material of the substrate;
c) the power of the laser;
d) the approach direction and angle of the laser; and
e) the melting run-off, i.e. the local melting of peaks to flow into the valleys. The information from different substrates may be saved in multiple databases and then prior knowledge and computer data can be utilized, along with all of the factors listed above, to control the laser to remove the irregularities in and on the surface of the substrate. Current processes do not consider these factors simultaneously. In fact, one point of novelty of the current process is in utilizing all possible combinations of the factors listed above.

Figure 1:
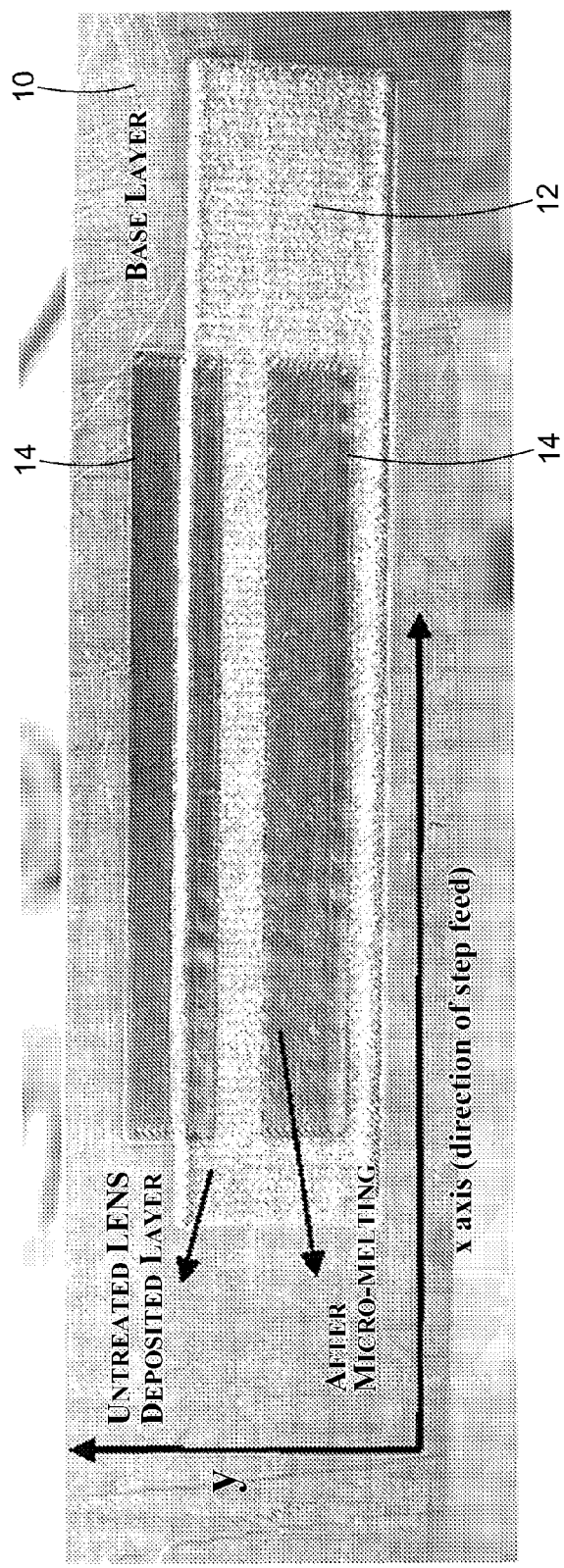
FIG. 1 is a 3D scan of a titanium alloy sample treated by micro-melting.
Figure 2A:
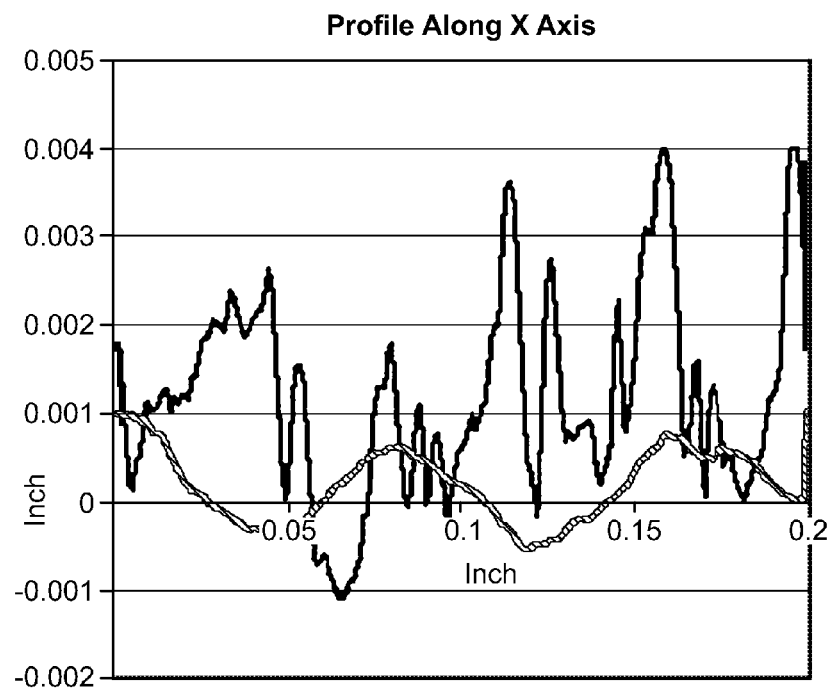
FIGS. 2a and 2b are surface roughness profiles along the X axis and Y axis, respectively.
Figure 2B:
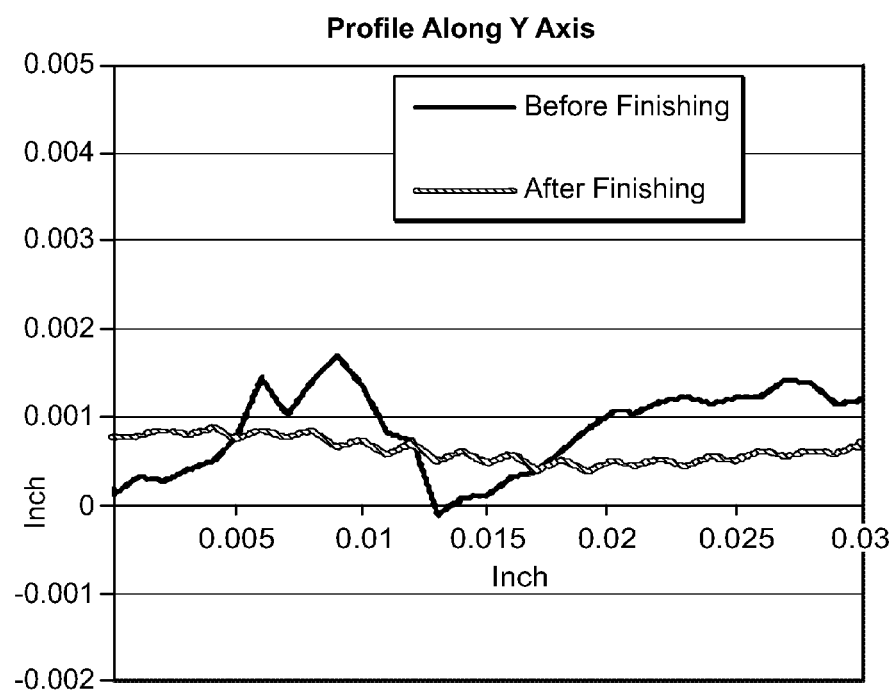

FIG. 1 shows a titanium plate 10 with a single layer of laser deposited particulate Titanium alloy 12. Following the initial deposition, micro-melting was applied (as shown at 14) to improve the surface roughness of a subsection of the deposited material. The particulate material 12 was deposited along the y direction. Then the laser 16 as further shown in FIG. 6 (Nd:YAG @350 w), was scanned along the x direction with scan spacing 0.01" and a travel speed of 20 inches per minute. A profile of the surface was recorded before and after the micro-melting pass using a 3D scanning system with a Federal Products probe. This system was developed in-house and calibrated using reference roughness blocks. As can be seen in FIGS. 2a and b, the surface profiles of the post-processed areas are significantly improved.

The preliminary work detailed above indicates that micro-melting can improve the quality of surfaces prepared by metal deposition methods. However, its utility in processing surfaces produced by other processing methods remains an issue for investigation. As a partial and preliminary assessment of the capability of micro-machining to improve surface roughness of non-particulate surfaces selectively, without additional metal deposition the following assessment was performed:

Two steel plates were marked using a cone mill. Details of the grooves inscribed on the plates are shown in FIGS. 3 (a) and (b).

Figure 5:
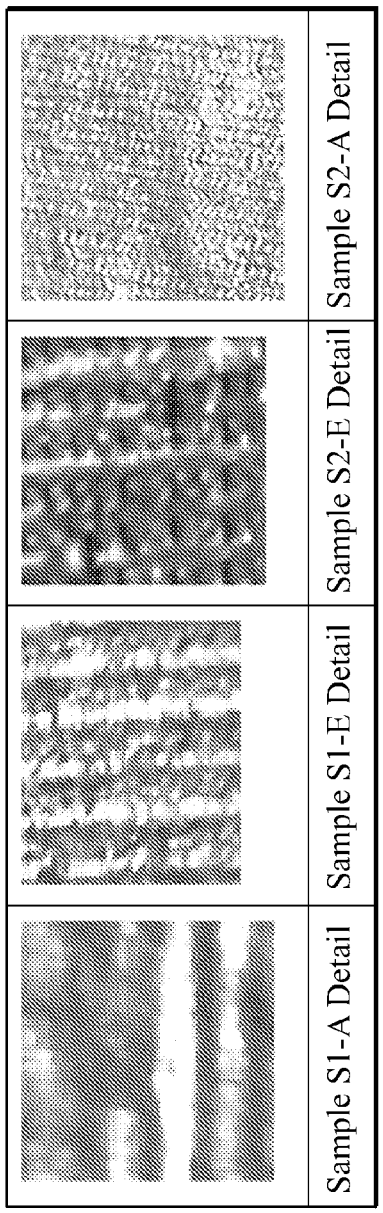
FIG. 5. shows in detail the surfaces of steel in accordance with selected areas of the samples in accordance with Table 1.

Each of these plates was then processed by selective micro-melting. Several settings of laser power (240 W to 450 W) were used. Table 1 below details the process setting. FIGS. 4a and b show the results of processing plates S1 and S2 respectively. There is obviously a difference in the quality of the surfaces produced. A contrast of treatments S1-A and S2-A, along with S1-E and S2-E is shown in FIG. 5.

Figure 6:
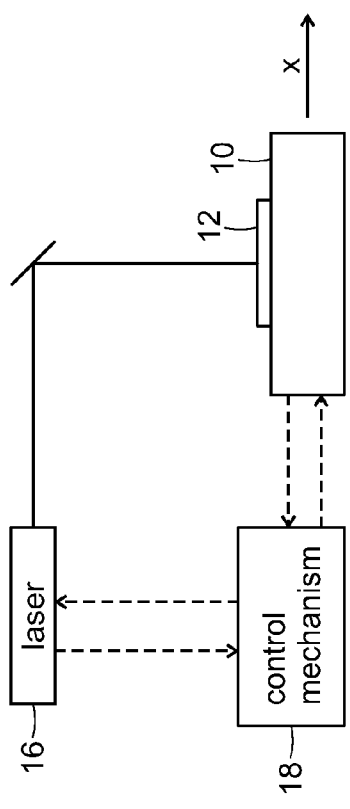
FIG. 6 shows a laser processing system in accordance with an embodiment of the invention.

The micro melting process therefore includes the steps of providing the laser 16, providing a control mechanism 18 associated with the laser, and using the control mechanism 18 to melt the surface irregularities on the substrate 12 as shown in FIG. 6. The control mechanism 18 monitors and varies the power of the laser 16 responsive to the approach direction of the laser beam to control the manner in which irregularities or surface features on the substrate 12 are melted, ambient atmospheric conditions, and induced motion between the laser beam and the irregularities or surface features on the substrate 12 being processed.

TABLE 1

Processing Parameters for Sample Preparation

| Sample | Laser Power (W) | Scan Speed (in./min.) | Scan Spacing (In) | Scan Direction = Groove Direction |
|---|---|---|---|---|
| S1, S2 A | 350 | 20 | 0.01 | |
| S1, S2 B | 350 | 20 | 0.01 | +↕ |
| S1, S2 C | 350 | 20 | 0.01 | + |
| S1, S2 D | 350 | 20 | 0.01 | |
| S1, S2 E | 350 | 20 | 0.03 | |

The initial quality of the surfaces was not quantified using conventional surface roughness measures such as $R_a$ or $R_z$ since these surfaces were artificially textured to demonstrate the effectiveness of the selective micro-melting process. An evaluation of the results shows that the surface roughness of the treated surface is in the range of $R_a$ 20 μm.

It was noted after an unplanned exposure of the sample to the atmosphere for a period of four months after micro-melting, that over this period of atmospheric exposure, there is a noticeable difference in the degree of surface deterioration (i.e. corrosion) for the different treatments. There is no visible oxidation in sample S2-A, whereas Samples S1-E and S2-E have corroded conspicuously.

The foregoing description has been limited to a few embodiments of the invention. It will be apparent, however, that variations and modifications can be made to the invention, with the attainment of some or all of the advantages. Therefore, it is the object of the claims to cover all such variations and modifications as come within the true spirit and scope of the invention.

What is now claimed is:

1. A micro melting method to melt surface irregularities or features on a surface of a substrate, said method comprising:
   providing a laser;
   providing a control mechanism associated with the laser;
   accessing a database on which records regarding multiple substrates are stored, wherein said database further includes information regarding melting and flow of the multiple substrates; and
   using the control mechanism to melt the surface irregularities or features on the substrate, said control mechanism varying the laser intensity and direction by varying and monitoring the power of the laser, the approach direction of the laser to control the manner in which irregularities or surface features are melted, ambient atmospheric conditions, induced motion between the laser and the surface being processed.

2. The micro melting method as claimed in claim 1, wherein said substrate is a solid free-form fabrication.

3. The micro inciting method as claimed in claim 1, wherein the irregularities or surface features have a roughness of about 25 μm to 50 μm.

4. The micro melting method as claimed in claim 1, wherein said method further includes the step of moving the substrate.

5. A micro melting method to melt surface irregularities or features on a surface of a solid free-form fabrication, said method comprising the steps of:
   identifying a material from which the solid free-form fabrication is formed;
   identifying a direction of grooves on the surface formed by free-form fabrication; and
   adjusting a power of a laser that provides a laser beam and causing relative motion between a laser beam and the surface of the free-form fabrication responsive to the nature of the irregularities or features, the material of the free-form fabrication, the power of the laser, an approach direction and angle of the laser beam, and the melting characteristics of the free-form fabrication.

6. The micro melting method as claimed in claim 5, wherein said step of adjusting the power of the laser and causing relative motion between the laser beam and the surface of the free-form fabrication is further responsive to ambient atmospheric conditions.

7. The micro melting method as claimed in claim 5, wherein the relative motion between the laser beam and the surface of the free-form fabrication is in a direction that is generally transverse to the direction of the grooves.

8. The micro melting method as claimed in claim 5, wherein the irregularities or surface features have a roughness of about 25 μm to 50 μm.

9. The micro melting method as claimed in claim 5, wherein said method further includes the step of moving the substrate.

10. The micro melting method as claimed in claim 5, wherein said method further includes the step of accessing a database on which records regarding multiple free-form fabrication materials are stored.

11. The micro melting method as claimed in claim 10, wherein said database further includes information regarding melting and flow of the multiple free-form fabrication materials.

12. A micro melting method to melt surface irregularities or features on a surface of a solid free-form fabrication, said method comprising the steps of:

identifying a material from which the solid free-form fabrication is formed;

identifying a first direction of grooves on the surface formed by free-form fabrication; and adjusting a power of a laser that provides a laser beam and moving the surface of the free-form fabrication in a second direction that is generally transverse to the first direction responsive to the nature of the irregularities or features, the material of the free-form fabrication, the power of the laser, an approach direction and angle of the laser beam, and the melting characteristics of the free-form fabrication such that melted material flows along the grooves in the first direction.

13. The micro melting method as claimed in claim 12, wherein said method further includes the step of accessing a database on which records regarding multiple free-form fabrication materials are stored.

14. The micro melting method as claimed in claim 13, wherein said database further includes information regarding melting and flow of the multiple free-form fabrication materials.

* * * * *